United States Patent [19]

Adkins et al.

[11] 4,332,277

[45] Jun. 1, 1982

[54] PIPELINE PIGGING PLUG

[75] Inventors: David E. Adkins; Arthur H. T. Chin; Ronnie E. Haws; Robert H. Wittman, all of Houston, Tex.

[73] Assignee: Hughes Undersea Coupling, Inc., Houston, Tex.

[21] Appl. No.: 183,828

[22] Filed: Sep. 3, 1980

[51] Int. Cl.³ .............................................. F16L 55/10
[52] U.S. Cl. ..................................... 138/89; 405/170
[58] Field of Search ........................... 138/89, 93, 97; 405/170

[56] References Cited

U.S. PATENT DOCUMENTS

| | | | |
|---|---|---|---|
| 3,107,696 | 10/1963 | Ver Nooy | 138/89 |
| 3,252,226 | 8/1970 | McCarron | 405/170 |
| 3,943,982 | 3/1976 | Lecordier | 138/89 |
| 3,978,678 | 9/1976 | Duncan et al. | 138/89 X |

*Primary Examiner*—James E. Bryant, III

*Attorney, Agent, or Firm*—Robert A. Felsman

[57] ABSTRACT

The invention is for a pipeline pigging plug which is adapted to be launched from normal instrumented pig launchers and received in comparable pig traps utilized in connection with pipeline operations. The pigging plug is arranged for pigging along the internal surface of a pipeline by the application of fluid pressure therebehind until it arrives at a selected point in the pipeline where a plug is to be effected. Upon application of pressurized fluid to the apparatus the pig is caused to become set or locked in position within the pipeline and a fluid-tight seal is created with the pipeline by the plug. Thus set, the plug is self-energized, i.e., it will remain set against high differential pressure without continued application of said pressurized fluid. When it is desired to remove the plug it can be deactuated and removed by a tether or by the application of fluid pressure thereto as with a conventional pig.

6 Claims, 5 Drawing Figures fig.4 fig. 5

PIPELINE PIGGING PLUG

BACKGROUND OF THE INVENTION

A. Field of the Invention

This invention relates to a pipeline pigging plug which is arranged for insertion in a pipeline and pigged to a predetermined location and then actuated to a set position to thereby create a plug in the pipeline.

B. Background of the Prior Art

There have been quite a number of tools developed for pigging through a pipeline for various purposes, including cleaning the same, magnetically searching for defects in the pipe, and even some of the pigs are arranged for blocking the pipeline to resist very low pressures.

However, none of these prior art devices have been fully satisfactory for providing a pigging device which can be moved to a predetermined location and there set to create a plug, which plug is arranged to resist extremely high fluid pressures thereagainst.

The following U.S. Pat. Nos. are generally representative of the prior art:

3,525,226
3,593,749
3,690,348
3,746,026
3,943,982
3,978,678

SUMMARY OF THE INVENTION

It is therefore an object of the present invention to provide an improved pipeline pigging plug of the type which can be pigged to a predetermined location, actuated to the set position to create a plug, and which plug is arranged to withstand extremely high fluid pressures without failing. It is also an object of this invention to provide a pipeline pigging plug which can be used for other operations such as pipeline testing and the like, wherein portions of the pipeline may be sealed off and pressure tested, for example.

Briefly stated, this invention relates to a fluid-propelled pipeline pigging plug adapted for plugging a pipeline at a selected location therein. It includes the combination of a body member having an elastomeric disc scraper for sealingly and slidably engaging the inside circumferential surface of the pipeline and supporting the body member in the pipeline. Thus, the body member is adapted for propulsion through the pipeline by the application of fluid pressure to the pipeline and against the body member. A slip support assembly is connected to the body member, which support assembly also supports a plurality of axially movable slips adapted for wedging into locking engagement with the inside surface of the pipeline in response to axial movement thereof relative to the support assembly. Second seal means are provided for making a fluid-tight seal between the plug and the inside of the pipeline while the slips are engaged with the pipeline. Means are provided for collectively moving the slips into locking position with the pipeline. Thus, the plug may be inserted into the pipeline and pushed axially by fluid pressure along the inside thereof and set in fluid-tight sealing relationship therewith.

The invention may include a slip actuator assembly connected to the body member for axial movement relative to the support assembly and may also include means carried by the actuator assembly for engaging the slips and urging the same into the aforesaid locking engagement. Guide means may also be supported between the support assembly and the moving means for maintaining axial and circumferential alignment thereof when the same are moved axially relative to each other. Means may also be provided for normally urging the slips axially relative to the support assembly in a direction opposite to the moving means to thereby prevent premature setting of the slips and to assist unseating of the slips.

The moving means includes a pair of fluid-actuated piston and cylinder assemblies connected to the body member. The piston and cylinder assemblies are provided with a source of fluidized pressure, which may be an onboard accumulator, for example, or a hydraulic line leading to an external source of hydraulic pressure. Certain embodiments of the invention may also include second support means for supporting the body member at a point axially spaced apart from the disc scraper, and in fact, may be an additional disc scraper or other guide means.

DESCRIPTION OF THE PREFERRED EMBODIMENT

Figure 1:
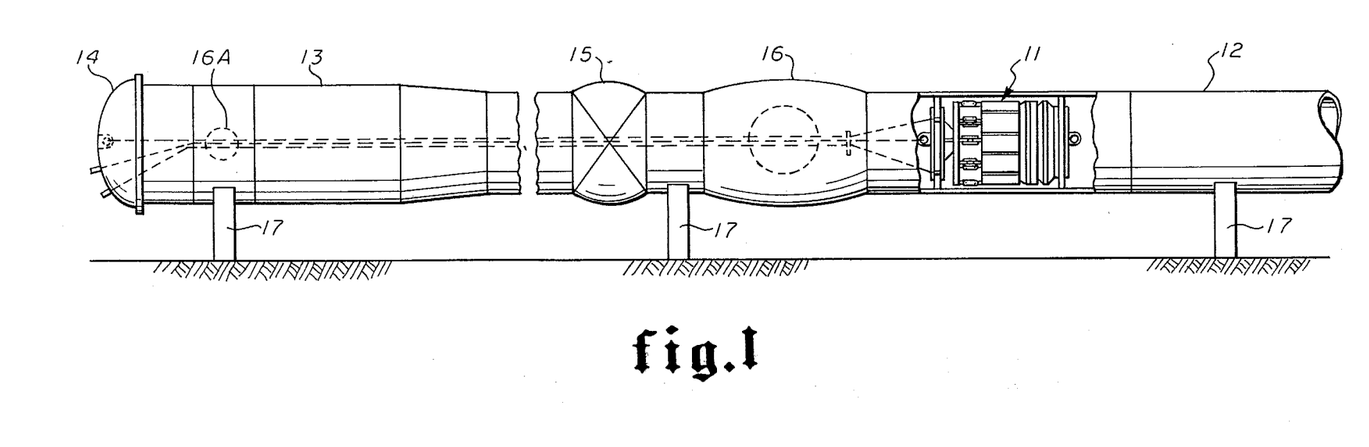
FIG. 1 is the side elevation view of a conventional pig launching device partially broken away and showing a pigging plug of this invention having passed therethrough.

Referring now to FIG. 1, the pigging plug of this invention is generally designated by the numeral 11 and is shown inserted in a pipeline 12 through a conventional pig launcher 13 through door 14, which is shown in the closed position. After positioning of plug 11 in launcher 13, fluid pressure is applied through tee 16A to cause plug 11 to move through valve 15 and tee 16 and into pipeline 12. Pipeline 12, launcher 13, tee 16 and tee 16A are shown supported on conventional support 17.

Figure 2:
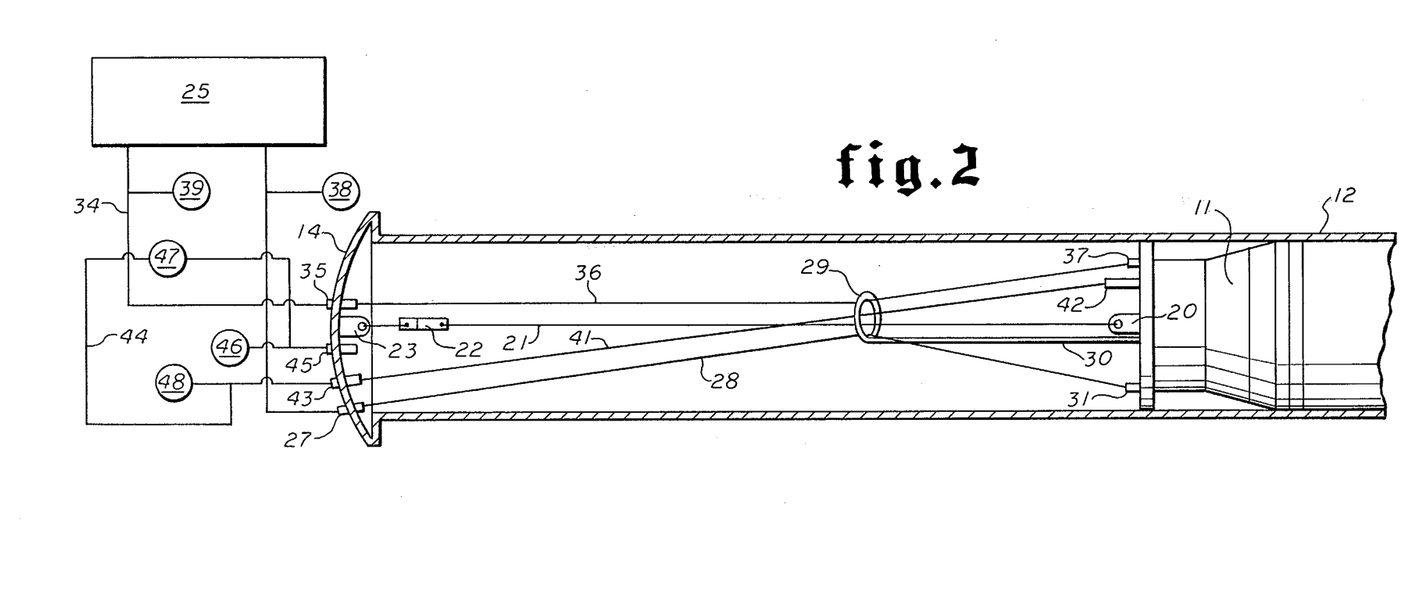
FIG. 2 is an enlarged fragmentary view of the apparatus shown in FIG. 1 but showing the hydraulic connectors and the like in greater detail.

Referring now to FIG. 2, the hydraulic supply system and other control systems will now be described. The left end of pigging plug 11 is shown having a pad eye 20 to which is connected a tether in the form of steel cable 21 which in turn is connected to weak link 22 which in turn is connected to a pad eye 23 connected to the inside of door 14. It is to be understood that upon insertion of pigging plug 11 into pipeline 12 a sufficient amount of steel cable 21 will be coiled behind pigging plug 11 such that pigging plug 11 may be pigged to the desired location by selecting the length of steel cable 21. However, it is to be understood that other positioning means may be used as, for example, the pigging plug may have magnetic, radioactive or acoustical means carried therewith such that its location can be monitored externally and the pigging operation terminated when the pig has arrived at the desired location.

In the embodiment shown, actuating fluid in the form of hydraulic fluid is applied from an external source. For example, a hydraulic power supply 25 capable of producing 7,500 p.s.i. or the like is shown connected by hydraulic locking line 26 which in turn connects with connector 27 mounted in door 14 which in turn connects to hydraulic line 28 passing through umbilical ring 29 supported on ring support rod 30 attached to pig 11. Line 28 is in turn connected to lock coupling 31 which provides hydraulic fluid to the moving means or hydraulic cylinders which are to be descibed hereinafter.

Similarly, hydraulic power supply 25 is connected to unlock line 34 which in turn connects to connector 35 passing through door 14 which in turn connects to line 36 which in turn connects to unlocking connector 37 in turn is connected to hydraulic lines for causing the hydraulic piston and cylinder assemblies to move pigging plug 11 to the unlock position as will be described hereinafter. Line 26 may be provided with a gauge 38 to monitor fluid pressure and line 34 may be similarly supplied with gauge 39 for the same purpose.

In addition, in certain instances it is desirable to have means for detecting the fluid pressure on each side of plug 11 and for that purpose there is provided pressure line 41 which is connected to plug 11 through connector 42 which in turn is connected to means for sensing the pressure on the opposite end of plug 11 as will be described hereinafter.

The other end of line 41 is connected to connector 43 which is connected to external line 44 which in turn is connected to connector 45 passing through door 14 which is adapted for taking a pressure reading inside of launcher 13. There is provided a gauge 46 for reading actual pressure in launcher 13 and gauge 48 for reading fluid pressure on the opposite end of plug 11. Gauge 47 is also connected in line 44 for reading differential pressure on each side of plug 11.

It is to be understood that sufficient coils of hydraulic lines 28, 36 and 41 will be provided inside launcher 13 to extend the same distance or at least as far as steel cable 21. Alternately, instead of a coil of lines, hydraulic winch means may be placed in launcher 13 to control the amount of payout thereof. It is also to be understood that other sources of hydraulic fluid may be used as, for example, an onboard supply source carried with pigging plug 11 which may be actuated remotely.

In FIGS. 1 and 2, plug 11 is shown after having been pigged to the desired location in pipeline 12 by the application of fluid pressure therebehind as any conventional pig would be pigged along pipeline 12, until the same is stopped by steel cable 21, having then reached the desired location for the plugging operation to be performed.

Figure 4:
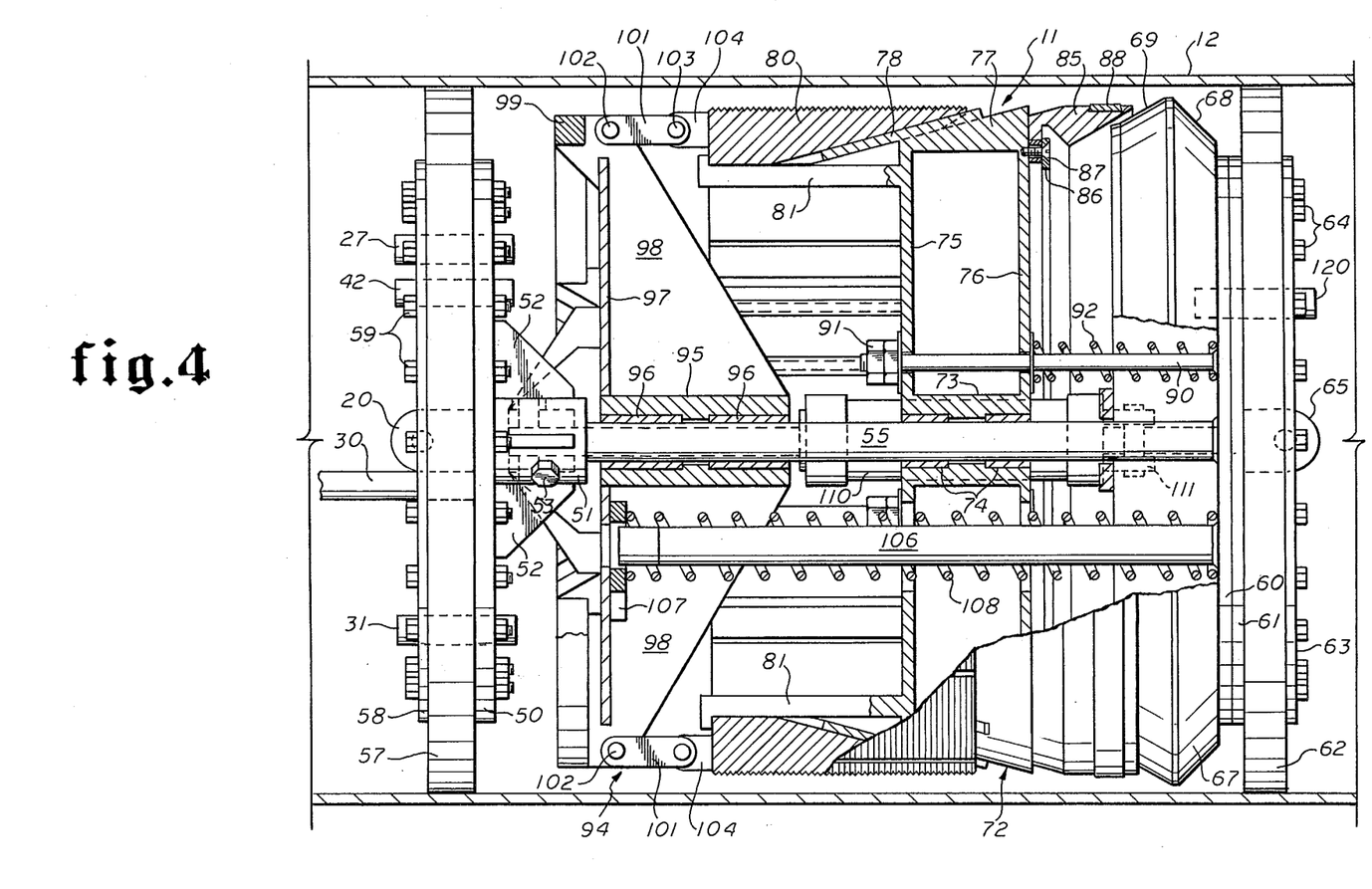
FIG. 4 is a side elevation view partially broken away but largely in central section of the pigging plug of this invention shown supported in a pipeline in its unset or unlocked position.

Referring now to FIG. 4, pigging plug 11 of this invention will be described in its position immediately prior to the setting or plugging operation. Pad eye 20 is shown connected to what may sometimes be described as the body member and this may include an annular scraper plate 50 having tube 51 centrally positioned and extending axially therefrom on the side opposite pad eye 20. Tube 51 is additionally supported by a plurality of gussets 52 also connected to plate 50. Tube 51 is rigidly attached as by lock bolt 53 to a chrome-plated rigid shaft 55 which extends centrally through plug 11.

Plate 50 carries therewith and supports an annular disc scraper 57 of elastomeric material such as neoprene or polyurethane. Scraper 57 is designed to slidably and sealably engage the internal surface of pipeline 12 such that fluid pressure thereagainst causes plug 11 to be pigged through pipeline 12. Disc scraper 57 is held in place by retainer ring 58 which is connected to plate 50 by a plurality of bolts 59.

The other end of shaft 55 is supported by similar means including an annular retaining head 61 and spacer plate 60 which are welded or otherwise affixed thereto, which in turn support an annular elastomeric disc scraper 62 which is similar to disc scraper 57 and which is held in place by retainer ring 63 as by bolts 64. In addition, head 61 may have attached therewith pad eye 65 for handling purposes. Disc scraper 62 sealingly and slidably engages the inside surface of pipeline 12 the same as scraper 57, such that plug 11 may be pigged from either direction when required. In addition, disc scraper 62 supports the forward end of plug 11 to maintain the same centrally positioned within pipeline 12. However, it is to be understood that in certain embodiments other centralizing means such as support wheels arranged to contact pipeline 12 may be utilized for the forward end of plug 11.

The aforesaid body member may sometimes be described as including an annular seal expander disc 67 which is shown centrally mounted on shaft 55 and welded or otherwise supported on spacer plate 60. Disc 67 has a frustoconical or tapered surface 68 on a forward side thereof and a similarly tapered surface 69 on the rearward side thereof. Surface 69 acts as a ramp for wedging high pressure seal means into engagement with the internal surface of pipeline 11 as will be described hereinafter.

Shaft 55 has slidably mounted thereon a slip and seal support assembly generally designated by the numeral 72 and which is comprised of a tube 73 supporting internal brass bearings 74 which are arranged for axial sliding on shaft 55. Tube 72 supports a pair of radially-extending plates 75 and 76 which in turn support an annular ring 77. The outer surface of ring 77 is generally tapered and has extending axially therealong a plurality of retainer portions 78 which are circumferentially spaced apart so as to provide a plurality of inclined U-shaped channels, each of which is adapted for receiving in axial sliding engagement therewith a slip 80 which is similarly tapered on the inward side thereof. It is to be understood that the external surfaces of slip 80 are provided with threads or other appropriate gripping surfaces for engaging the internal surface of pipeline 12. It is to be understood that ring 77 and plate 75 also support a plurality of axially-extending bars 81, the left ends of which, as viewed in FIG. 4, are adapted for engagement with and abutment by actuator means, as will be described hereinafter.

The forward sides of plate 76 and ring 77 has supported thereon a high-pressure cup-shaped seal 85 which is retained thereon by retainer ring 86 held in place by a plurality of screws 87 engaging plate 76. Seal 85 is of an elastomeric material such as polyurethane. The internal lip of seal 85 is arranged for engagement by and wedging to the sealed position by contact with surface 69 or disc 67 upon relative axial movement therewith. Seal 68 may also have positioned or imbedded about the external surface thereof elastomeric rings 88 of different durometer rating than that of seal 68 to give added flexibility or rigidity thereto such that the same can conform to wide variations in the internal surface of various pipes.

Support assembly 72 is held in axial alignment as shown, that is, held against rotational movement relative to shaft 55 by guide means in the form of a pair of parallel and longitudinally-extending guide rods 90, the forward ends of which are secured to head 61 as by welding or the like. Rods 90 pass through disc 67, plate 76 and 75, support assembly 72, and are secured by nuts 91. Only one rod 90 is visible in FIGS. 4 and 5. Thus arranged, rods 90 prevent rotation of support assembly 72 relative to the rest of pig 11. In addition, means are provided for urging support assembly 72 axially away from disc 67 such that seal 85 may not be prematurely or accidentally moved to the setting or sealing position. These urging means include a helical spring 92 mounted about each rod 90 and arranged to abut head 61 on one end and plate 76 of support assembly 72 on the other end. Springs 92 are arranged to exert the aforesaid pressure to urge support assembly 72 and disc 67 axially apart, but may be overcome by the hydraulic actuation means which are described hereinafter.

The actuation means of this invention may also be described as including an actuator assembly generally designated by the numeral 94 and generally includes a tube 95 which supports internally thereof brass bearings 96 which are arranged for axial sliding movement on shaft 55. Tube 95 has attached to the rearward end thereof an annular plate 97 which has connected therewith a plurality of radially-extending gusset plates 98, the outward ends of which are connected to rearward ring 99, for supporting gusset plates 98 on their radially-outward ends.

Figure 5:
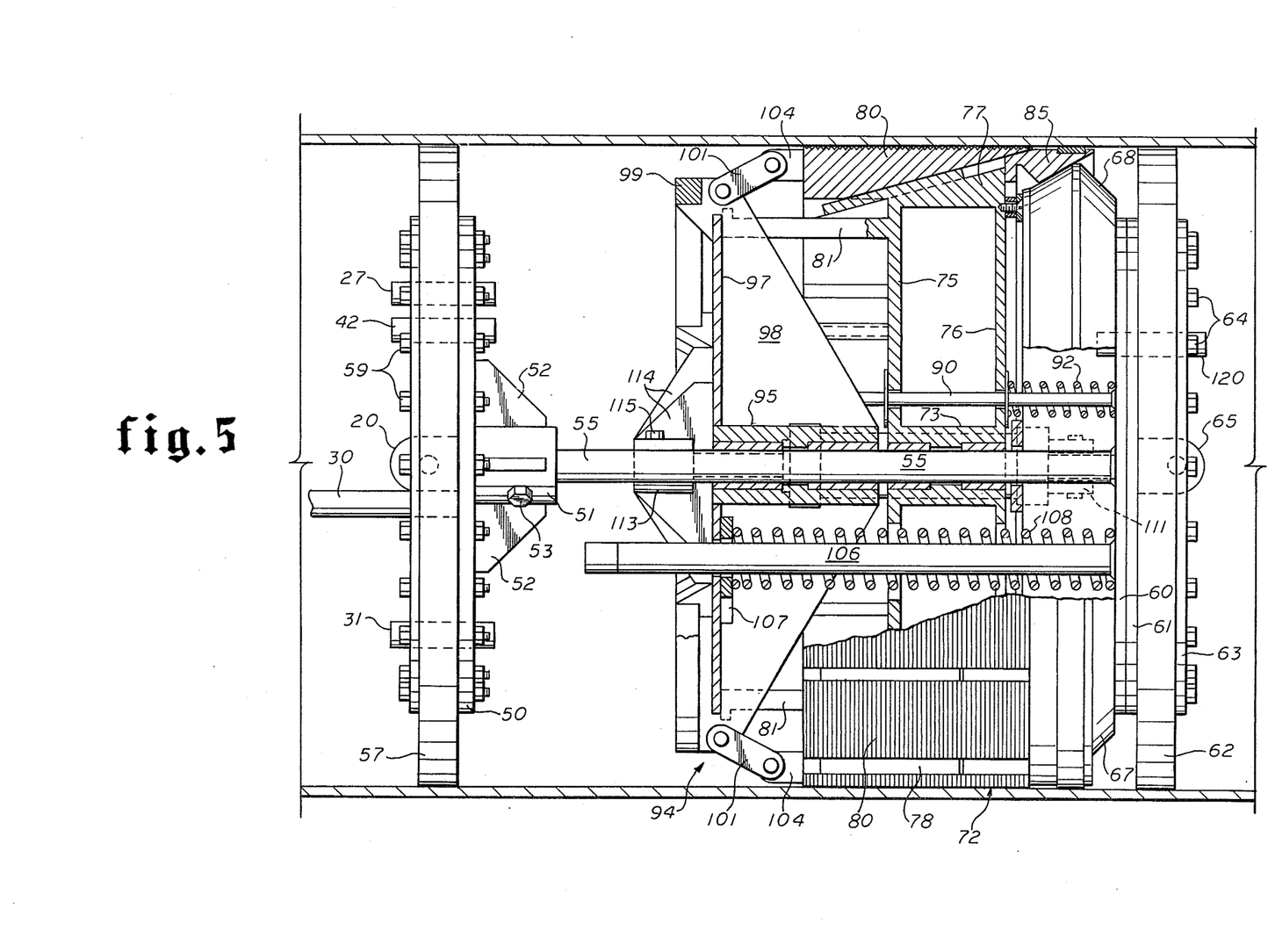
FIG. 5 is a view similar to FIG. 4 but showing the plug of this invention moved to the engaged or locked or plugging position in the pipeline.

The radially-outward end of each of the gusset plates 98 supports and has pivotally attached therewith a link 101 as by pin 102, with the opposite end thereof being connected as by pin 103 to pad eye 104 attached to the rearward end of one of the slips 80, as shown. The pivotal arrangement of links 101 provides axial thrust to slips 80 such that slips 80 are wedged radially outwardly into engagement with the internal surface of pipe 12 as shown in FIG. 5. As actuator assembly 94 is moved axially to the right as shown in FIGS. 4 and 5, slips 80 contact the inside of pipeline 12 and lock support assembly 72 in place. Continued stroking of the hydraulic cylinder assemblies, which will be described hereinafter, pulls head 61 and disc 67 to the left, as viewed in FIG. 5, relative to support assembly 72, which causes seal 85 to be wedged radially-outwardly into engagement with the inside of pipeline 12 in a fluid-tight seal.

Guide means are provided to maintain axial and circumferential alignment, that is to say, to prevent rotational movement of actuator assembly 94 relative to shaft 55 and support assembly 72 and guide means are in the form of a pair of elongated, parallel, and longitudinally-extending guide rods 106, the right ends of which, as viewed in FIGS. 4 and 5, are secured as by welding or the like to head 61. Only one rod 106 is visible in FIGS. 4 and 5. The left ends of rod 106 are arranged for passing through openings provided in plate 97 which has supported thereon pad 107. Rods 106 are arranged to pass through support assembly 72 such that support assembly 72 and actuator assembly 94 may move axially therealong. In addition, means are provided for urging actuator assembly 94 axially apart from head 61 and this takes the form of helical springs 108, one of which is mounted about each rod 106 with one end abutting head 61 and the other end abutting pad 107. Springs 108 are selected such that they will maintain or urge actuator assembly 94 axially apart from disc 67 and therefore away from support assembly 72, but may be overcome by the hydraulic system hereinafter described.

Figure 3:
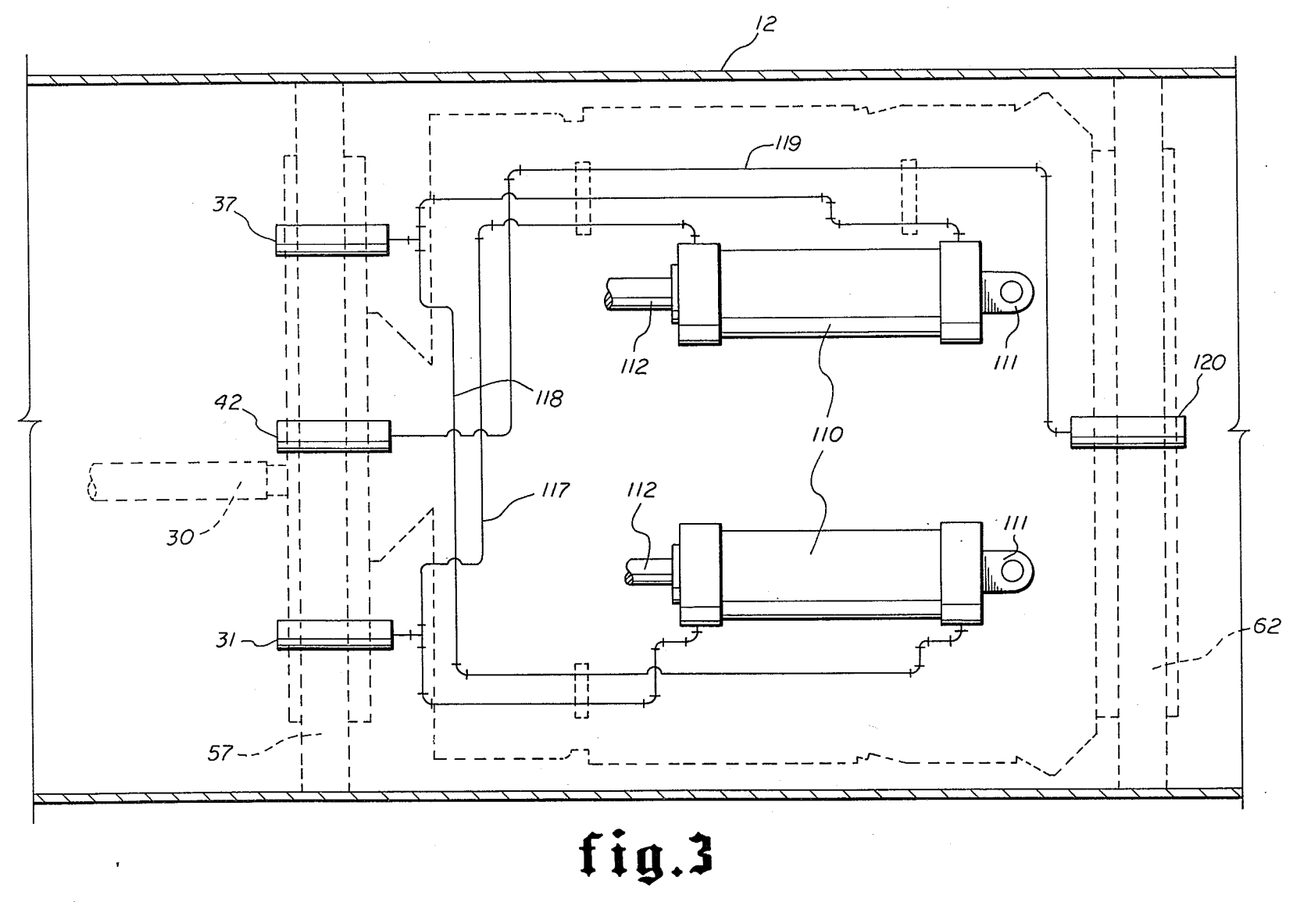
FIG. 3 is a top plan view in somewhat schematic form and enlarged in size showing the hydraulic cylinder assemblies which constitute a portion of the aforesaid moving means and showing the hydraulic connections therewith.

Means are provided by moving actuator assembly 94 axially relative to support assembly 72 and disc 67 and these means take the form of a pair of hydraulic cylinders 110, only one of which is visible in FIGS. 4 and 5, but both of which are shown in FIG. 3. Cylinders 110 are aligned parallel with shaft 55 and spaced radially therefrom. The forward ends of cylinders 110 are connected by cylinder connectors 111 as by pins to disc 67. Each of the cylinders 110 has extendable therefrom a piston rod 112, each of which has connected thereto a clevis bracket 113, each of which is connected as by gussets 114 to actuator assembly 94, as best seen in FIG. 5. It is to be understood that each bracket 113 is secured to a rod 112 as by clevis pin 115. Hence, upon retraction of piston rods 112 into cylinders 110, actuator assembly 94 is then carried axially to the right until slips 80 engage the internal surface of pipeline 12. During such movement, links 101 urge slips 80 axially along retainer portions 78 of support assembly 72. Continued pull of hydraulic cylinders 110 causes seal 85 to be wedged radially outwardly by surface 69 into a fluid-tight seal with the internal surface of pipeline 12. This locked and sealed condition is generally shown in FIG. 5. Conversely, extension of piston rods 12 will cause the reverse sequence of operations to thereby unlock slips 80 and unseat seal 85 to return plug 11 to the condition shown in FIG. 4, for example.

Nuts 91 on guide rods 90 also retain support assembly 72 from axial movement to the left beyond that shown in FIG. 4 such that, with continued axial movement of actuator assembly 94 to the left, as shown in FIG. 4, slips 80 become fully disengaged. It should also be understood that helical springs 92 and 108 also urge axial separation of support assembly 72 from disc 67 and actuator assembly 94 away from disc 67 and support assembly 72. This is important to provide a means whereby plug 11 may be disengaged in the event of failure of the hydraulic means to be described hereinafter. Hence, by substantially equalizing the pressure on each side of plug 11 in pipeline 12, springs 92 and 108 cause the plug to become unseated in the absence of any hydraulic pressure acting on piston rods 112.

Referring now to FIG. 3, the operation of hydraulic cylinders 110 and piston rods 112 will be further explained. Locking connector 31 is shown connected by line 117 to the setting or locking ends of cylinders 110 such that fluid pressure applied thereto will move pistons (not shown) in cylinders 110 and piston rods 112 to the right. Conversely, unlock connector 37 is connected to hydraulic line 118, which connects to the opposite ends of cylinders 110 such that upon application of hydraulic fluid pressure thereto, the pistons in cylinders 110 cause piston rods 112 to be extended to the left, as viewed in FIG. 3. Thus, by selective application of hydraulic pressure to the lines 117 and 118, piston rods 112 may be retracted or extended as desired to set and unset or lock and unlock pig 11.

Connector 42 is also shown connected to line 119, which is connected to connector 120 positioned on the forward end of pig 11 and is adapted for receiving any fluid pressure on that end of pig 11. Hence, the fluid pressure on line 119, which is connected to line 41 as heretofore described and shown in FIG. 2 may be read at gauge 48. Similarly, pressure on the other side of pig 11 may be read at gauge 46. The differential pressure on both sides of pig 11 may be read by observation of differential pressure gauge 47.

In operation of the tool, pigging plug 11 is inserted in pipeline 12 and pigged by the application of fluid pressure thereagainst to the desired plugging location as shown in FIGS. 1 and 2. Upon reaching the plugging location, hydraulic pressure is applied on line 117 via line 28, which causes retraction of piston rods 112 carrying actuator assembly 94 axially therewith along shaft 55 and simultaneously compressing spring 108. During this sequence of operations, slips 80 are moved axially relative to support assembly 72 and wedged radially outwardly thereby into locking engagement with inside surface of pipeline 12. In addition, high pressure seal 85 is wedged outwardly by surface 69 of disc 67 into fluid-tight sealing relationship with the inside surface of pipeline 12, thus completing the plugging operation.

When it becomes desirable to unlock plug 11 from pipeline 12, pressure is equalized on each side of plug 11 and hydraulic pressure is released on line 117 and applied to line 118 to cause extension of piston rods 112. This extension causes actuator assembly 94 to move axially to the left as viewed in FIGS. 4 and 5, to thereby withdraw slips 80 from their locking engagement and permitting spring 92 to urge support assembly 72 axially to the left to thereby unseat seal 85.

In the set position of plug 11 as shown in FIG. 5, it is adapted to resist fluid pressure on the forward end thereof of a magnitude of several hundred pounds. It is to be noted that with the locking arrangement of the slips of the present invention, once slips 80 have become engaged, then any fluid pressure on the rearward side of pig 11 may be removed and plug 11 will contain fluid pressure on the forward side thereof. This ability to withstand a high pressure differential across the plug without pressure on cylinders 110 may sometimes be described as self-energizing. This is important to be able to conduct operations on pipeline 12.

If for some reason hydraulic cylinders 110 should malfunction and plug 11 become locked in pipeline 12, then pressure may be substantially equalized on both ends of plug 11, at which points springs 92 and 108 will cause unlocking by urging support assembly 72 and actuator assembly 94 away from the set and sealing position.

A further alternate way to effect unseating of plug 11 is to overpressurize the left end of plug 11 as viewed in FIG. 5, such that scraper disc plate 50 and shaft 55 are caused to move axially to the right which, together with the pressure exerted by springs 92 and 108, will cause unseating of slips 80 and seal 85. This action will force the slips off the pipe wall into their retracted position. It will thus be apparent that this invention provides a failsafe pigging plug which is adaptable for pigging to a preselected location for setting and which may be released from the plugging position when desired by alternative means.

Further modifications and alternative embodiments of the apparatus of this invention will be apparent to those skilled in the art in view of this description. Accordingly, this description is to be construed as illustrative only and is for the puppose of teaching those skilled in the art the manner of carrying out the invention. It is to be understood that the form of the invention herewith shown and described is to be taken as the presently preferred embodiments. Various changes may be made in the shape, size and arrangement of parts. For example, equivalent elements or materials may be substituted for those illustrated amd described herein, parts may be reversed, and certain features of the invention may be utilized independently of the use of other features, all as would be apparent to one skilled in the art after having the benefit of this description of the invention.

What is claimed is:

1. In a fluid-propelled pipeline pigging plug adapted for plugging a pipeline at a selected location therein, the combination comprising:

a body member having elastomeric means for sealingly and slidingly engaging the inside circumferential surface of said pipeline and supporting said body member in said pipeline, said body member being adapted for propulsion through said pipeline by the application of fluid pressure to said pipeline and against said body member;

a slip support assembly connected to said body member;

a plurality of axially movable slips, supported by said support assembly and adapted for wedging into locking engagement with the inside surface of said pipeline in response to axial movement thereof relative to said support assembly;

second seal means for making a fluid-tight seal between said plug and said pipeline while said slips are engaged with said pipeline;

said second seal means including an annular seal supported between said support assembly and said body number, said annular seal has a lip portion adapted for sealing engagement with said pipeline and including an elastomeric ring of different durometer rating embedded in the outside surface of said lip portion;

and means for moving said slips said into locking engagement with said pipeline;

whereby said plug may be inerted into said pipeline and pushed axially by fluid pressure along the inside thereof and set in fluid-tight sealing relationship therewith upon actuation thereof.

2. In a fluid-propelled pipeline pigging plug adapted for plugging a pipeline at a selected location therein, the combination comprising:

a body member adapted for insertion into and propulsion through said pipeline;

a pair of axially spaced apart elastomeric seals connected to said body for supporting said body and sealingly and slidingly engaging the inside circumferential surface of said pipeline, whereby said body member may be propelled through said pipeline by the application of fluid pressure to said pipeline and against said body member;

a slip support assembly connected to said body member for relative axial movement therewith;

a plurality of axially movable slips supported by said support assembly and adapted for wedging into locking engagement with the inside surface of said pipeline in response to axial movement thereof relative to said support assembly;

an annular seal supported between said support assembly and said body member for making a fluid-tight seal between said plug and said inside surface of said pipeline while said slips are engaged with said pipeline;

a slip actuator assembly connected to said body for axial movement relative to said support assembly;

means carried by said actuator assembly for engaging said slips and urging the same axially relative to said support assembly and into said locking engagement;

and fluid-actuated means for moving said support assembly axially relative to said body member and said actuator assembly to thereby move said slips into locking engagement with said pipeline and said seal into said fluid-tight sealing position;

whereby said plug may be inserted into said pipeline and pushed axially therealong by fluid pressure along the inside surface thereof and set in fluid-tight sealing relationship therewith upon actuation thereof.

3. In a fluid-propelled pipeline pigging plug adapted for plugging a pipeline at a selected location therein, the combination comprising:

a body member adapted for insertion into and propulsion through said pipeline;

a pair of axially spaced apart elastomeric seals connected to said body for supporting said body and sealingly and slidingly engaging the inside circumferential surface of said pipeline, whereby said body member may be propelled through said pipeline by the application of fluid pressure to said pipeline and against said body member;

a slip support assembly connected to said body member for relative axial movement therewith;

a plurality of axially movable slips supported by said support assembly and adapted for wedging into locking engagement with the inside surface of said pipeline in response to axial movement thereof relative to said support assembly;

an annular seal supported between said support assembly and said body member for making a fluid-tight seal between said plug and said inside surface of said pipeline while said slips are engaged with said pipeline;

a slip actuator assembly connected to said body member for axial movement relative thereto and related to said support assembly;

and means carried by said actuator assembly for engaging said slips and urging the same into said locking engagement;

guide means supported between said body member, said support assembly, and said actuator assembly for maintaining axial and circumferential alignment thereof when said body member, said support assembly, and said actuator assembly move axially relative to each other;

spring means normally urging said body member axially relative to said support assembly and said actuator assembly in a direction opposite to said fluid activated moving means, to thereby prevent premature setting of said slips and to facilitate unseating of said slips when desired.

whereby said plug may be inserted into said pipeline and pushed axially by fluid pressure along the inside surface thereof and set in fluid-tight sealing relationship therewith upon actuation thereof.

4. In a fluid-propelled pipeline pigging plug adapted for plugging a pipeline at a selected location therein, the combination comprising:

a body member adapted for insertion into and propulsion through said pipeline;

a pair of axially spaced apart elastomeric seals connected to said body for supporting said body and sealingly and slidingly engaging the inside circumferential surface of said pipeline, whereby said body member may be propelled through said pipeline by the application of fluid pressure to said pipeline and against said body member;

a slip support assembly connected to said body member for relative axial movement therewith;

a plurality of axially movable slips supported by said support assembly and adapted for wedging into locking engagement with the inside surface of said pipeline in response to axial movement thereof relative to said support assembly;

said annular seal being connected to said support assembly for making a fluid-tight seal between said plug and said inside surface of said pipeline while said slips are engaged with said pipeline;

and said body including a tapered annular portion forming an annular inclined ramp proximate the leading edge of said annular seal for wedging said seal to said fluid-tight position in response to axial relative movement of said seal toward said inclined ramp;

and fluid-actuated means for moving said slips into locking engagement with said pipeline;

whereby said plug may be inserted into said pipeline and pushed axially by fluid pressure along the inside surface thereof and set in fluid-tight sealing relationship therewith upon actuation thereof.

5. In a fluid propelled pipeline pigging plug adapted for plugging a pipeline at a selected location therein, the combination comprising:

a body member adapted for insertion into and propulsion through said pipeline;

a pair of axially spaced apart elastomeric seals connected to said body for supporting said body and sealingly and slidingly engaging the inside circumferential surface of said pipeline, whereby said body member may be propelled through said pipeline by the application of fluid pressure to said pipeline and against said body member;

a slip support assembly connected to said body member for relative axial movement therewith;

a plurality of axially movable slips supported by said support assembly and adapted for wedging into locking engagement with the inside surface of said pipeline in response to axial movement thereof relative to said support assembly;

an annular seal connected to said support assembly for making a fluid-tight seal between said plug and said inside surface of said pipeline while said slips are engaged with said pipeline;

said body including a tapered annular portion forming an annular inclined ramp proximate the leading edge of said annular seal for wedging said seal to said fluid-tight position in response to axial relative movement of said seal toward said inclined ramp;

said annular seal having a lip portion adapted for sealing engagement with said pipeline;

and including an elastomeric ring of softer durometer rating imbedded in the outside surface of said lip portion;

and fluid-actuated means for moving said slips into locking engagement with said pipeline;

whereby said plug may be inserted into said pipeline and pushed axially by fluid pressure along the inside surface thereof and set in fluid-tight sealing relationship therewith upon actuation thereof.

6. In a fluid-propelled pipeline pigging plug adapted for plugging a pipeline at a selected location therein, the combination comprising:

- a body member adapted for insertion into and propulsion through said pipeline;
- an elastomeric seal connected to said body for supporting said body and sealingly and slidingly engaging the inside circumferential surface of said pipeline, whereby said body member may be propelled through said pipeline by the application of fluid pressure to said pipeline and against said body member;
- a slip support assembly connected to said body member for relative axial movement therewith;
- a plurality of axially movable slips supported by said support assembly and adapted for wedging into locking engagement with the inside surface of said pipeline in response to axial movement thereof relative to said support assembly;
- an annular seal connected to said support assembly, and with said body member having means for urging said seal into a fluid-tight seal between said pig and said inside surface of said pipeline while said slips are engaged with said pipeline;
- a slip actuator assembly connected to said body for axial movement relative thereto and relative to said support assembly;
- means carried by said actuator assembly for engaging said slips and urging the same axially relative to said support assembly and into said locking engagement;
- and fluid-actuated means for moving said support assembly axially relative to said body member and said actuator assembly relative to said support assembly to thereby move said slips into locking engagement with said pipeline and said seal into said fluid-tight sealing position;
- whereby said plug may be inserted into said pipeline and pushed axially therealong by fluid pressure along the inside surface thereof and set in fluid-tight sealing relationship therewith upon actuation thereof.

* * * * *

UNITED STATES PATENT OFFICE
CERTIFICATE OF CORRECTION

Patent No. 4,332,277  Dated June 1, 1982

Inventor(s) David E. Adkins, et al

It is certified that error appears in the above-identified patent and that said Letters Patent are hereby corrected as shown below:

At column 3, line 19, --which-- should be inserted after "connector 37".

Signed and Sealed this

Twenty-first Day of December 1982

[SEAL]

Attest:

Attesting Officer

GERALD J. MOSSINGHOFF

Commissioner of Patents and Trademarks